US012256357B2

United States Patent
Gurumoorthy et al.

(10) Patent No.: US 12,256,357 B2
(45) Date of Patent: Mar. 18, 2025

(54) MULTI-SIM UE CAPABILITY INDICATIONS AND BAND CONFLICT RESOLUTION

(71) Applicant: Apple Inc., Cupertino, CA (US)

(72) Inventors: Sethuraman Gurumoorthy, San Jose, CA (US); Srirang A. Lovlekar, Cupertino, CA (US); Fangli Xu, Beijing (CN); Haijing Hu, Beijing (CN); Naveen Kumar R. Palle Venkata, San Diego, CA (US); Sarma V. Vangala, Campbell, CA (US); Yuqin Chen, Shenzhen (CN); Zhibin Wu, Los Altos, CA (US); Longda Xing, San Jose, CA (US); Rama Diwakara Rao Noolu, Fremont, CA (US); Birgit Breining, Munich (DE)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 17/441,834

(22) PCT Filed: Mar. 31, 2021

(86) PCT No.: PCT/CN2021/084420
§ 371 (c)(1),
(2) Date: Sep. 22, 2021

(87) PCT Pub. No.: WO2022/205072
PCT Pub. Date: Oct. 6, 2022

(65) Prior Publication Data
US 2022/0361132 A1   Nov. 10, 2022

(51) Int. Cl.
*H04W 60/00* (2009.01)
*H04W 68/00* (2009.01)

(52) U.S. Cl.
CPC ........ *H04W 60/005* (2013.01); *H04W 68/00* (2013.01)

(58) Field of Classification Search
CPC ... H04W 60/005; H04W 68/00; H04W 76/10; H04W 8/24; H04W 88/06
See application file for complete search history.

(56) References Cited

U.S. PATENT DOCUMENTS

2017/0208603 A1    7/2017  Goel
2019/0053130 A1    2/2019  Guo et al.
(Continued)

FOREIGN PATENT DOCUMENTS

CN    103281749 A    9/2013
CN    111918330       11/2020
(Continued)

OTHER PUBLICATIONS

International Search Report and Written Opinion for PCT/CN2021/084420; Mailed Dec. 30, 2021.
(Continued)

*Primary Examiner* — Marisol Figueroa
(74) *Attorney, Agent, or Firm* — Kowert, Hood, Munyon, Rankin & Goetzel, P.C.

(57) ABSTRACT

Devices and associated methods for operating a dual-subscriber identity module (SIM) dual-standby (DSDS) user equipment device (UE) configured with a first SIM and a second SIM. The UE transmits a connection request message to a base station over a first network using the first SIM, where the connection request message includes one or more capability indications of the UE. The UE receives a connection accept message from the base station, where the connection accept message includes one or more network capability indications corresponding to respective UE capability indications of the one or more UE capability indications. The UE performs communications with the base station according to the one or more network capability indications.

20 Claims, 10 Drawing Sheets

(56) References Cited

U.S. PATENT DOCUMENTS

| | | |
|---|---|---|
| 2021/0014667 A1 | 1/2021 | Lovlekar et al. |
| 2021/0352619 A1* | 11/2021 | Ryu ...................... H04W 60/04 |
| 2022/0110080 A1* | 4/2022 | Watfa .................... H04W 60/00 |
| 2022/0116847 A1* | 4/2022 | Rangaraju ............. H04W 40/02 |
| 2022/0132456 A1* | 4/2022 | Rajadurai .............. H04W 60/00 |
| 2023/0055018 A1* | 2/2023 | He ........................ H04L 5/0094 |
| 2023/0081647 A1* | 3/2023 | Zhang ................... H04L 63/101 |
| | | 370/329 |

FOREIGN PATENT DOCUMENTS

| | | | |
|---|---|---|---|
| EP | 3764686 A1 | 1/2021 | |
| IN | 202041040588 | * 9/2020 | |
| IN | 202041040588 A | * 3/2022 | .............. H04W 4/50 |
| WO | 2020185949 | 9/2020 | |

OTHER PUBLICATIONS

Office Action for CN 202180005668.3; Jan. 24, 2025.
VIVO "Summary of [Post111-e][917][Multi-SIM] Multi-Sim"; 3GPP TSG RAN WG2 Meeting #112e R2-2009325; Nov. 2, 2020.

* cited by examiner

US 12,256,357 B2

MULTI-SIM UE CAPABILITY INDICATIONS AND BAND CONFLICT RESOLUTION

PRIORITY CLAIM INFORMATION

This application is a U.S. National Stage application of International Application No. PCT/CN2021/084420, filed Mar. 31, 2021, titled "Multi-SIM UE Capability Indications and Band Conflict Resolution", which is hereby incorporated by reference in its entirety.

FIELD

The present disclosure relates to the field of wireless communication, and more particularly to a user equipment (UE) having multiple subscriber identity modules (SIMS) which performs dual-SIM dual-standby (DSDS) operations.

DESCRIPTION OF THE RELATED ART

Wireless communication systems are rapidly growing in usage. Further, wireless communication technology has evolved from voice-only communications to also include the transmission of data, such as Internet and multimedia content. In order to enable a wireless device to access a wireless communication network (e.g., a cellular telecommunication network) according to at least some wireless communication technologies and standards, a user may subscribe to a service provider (a "carrier"), who in turn may provide such services to the user, e.g., via a wireless communication network which they operate. Such subscribers in a wireless communication network are typically assigned subscriber identity information, which may for example be stored as part of a subscriber identity module (SIM) in the subscriber's wireless device. For example, many wireless devices may be provided with a slot for a removable subscriber identity module (SIM) card. Providing such a slot may enable users to select and/or change their subscriber identity independently from the wireless device, as the user may be able to switch out their current SIM card for a different SIM card at any given time as desired. More recently, UE devices may come equipped with an embedded SIM (eSIM), wherein an embedded memory in the UE stores subscriber identity information for the user.

Many UE devices today are being designed as dual-SIM or multi-SIM phones, wherein the UE is capable of storing two or more sets of subscriber identity information for the user. This enables the UE to, for example, store first subscriber identity information for a user's home telephone number and also store second subscriber identity information for the user's business telephone number. Alternatively, or in addition, one of the SIMs can be used primarily for voice calls with the other one can be used primarily for data transfers.

One type of dual-SIM UE is referred to as Dual-SIM Dual-Active (DSDA) and may contain multiple receiver (Rx) and/or transmitter (Tx) architectures. A DSDA UE is capable of using two SIMS and two radios, so as to maintain two active sets of data communication simultaneously, e.g., the UE may be conducting a voice call using one SIM while performing data communication (e.g., Internet browsing) on the second SIM.

Another type of dual SIM UE may have only a single Rx and/or Tx architecture (e.g., for cost savings and reduced size requirements) and may be referred to as Dual-SIM Dual-Standby (DSDS). In a UE which contains only a single receiver, only one SIM may be in operation at any given time. Thus when the UE is utilizing a first SIM for a voice call, the second SIM will be idle. In some instances, when a SIM is currently in use and the UE detects initiation of a higher priority activity which requires the other SIM, the UE may suspend activity on the first SIM in order to undertake the higher priority activity on the other SIM. In a UE having multiple SIM devices and only one radio, the UE may encounter network problems when a SIM suspends and then subsequently resumes a radio resource control (RRC) connection with the network.

To increase coverage and better serve the increasing demand and range of envisioned uses of wireless communication, in addition to the communication standards mentioned above, there are further wireless communication technologies under development, including 3GPP fifth generation (5G) new radio (NR) communication. Accordingly, improvements in the field in support of such development and design, and in particular with respect to multiple subscriber identity functionality, are desired.

SUMMARY

In light of the foregoing and other concerns, it would be desirable to expand the functionality of wireless devices with respect to subscriber identities. In particular, it would be desirable to provide improved capability information exchange between the wireless device and the network in an energy-efficient manner. The present disclosure relates to such techniques for exchanging capability indications according to various embodiments.

Embodiments of the disclosure may thus be directed to methods for exchanging capability information in a multi-SIM device, to a UE device configured to implement such a method, and/or to a non-transitory computer accessible memory medium storing program instructions executable by a processor to implement such a method. The multi-SIM device may be of a variety of types, including but not limited to a dual-SIM dual-standby (DSDS) UE device, a single-receive DSDS (SR-DSDS) device, a dual-receive DSDS (DR-DSDS) device, a dual-SIM dual-active (DSDA) device, or any type of device with more than two SIMS. The UE device may include a radio (e.g., including one or more antennas and/or other radio components) for performing wireless communication. The UE device may also include a processor configured to implement part or all of the method (e.g., by executing program instructions). The UE device may further include one or more user interface elements, such as a display. In addition, the UE device may include a non-transitory computer accessible memory medium, which may store program instructions executable by the processor of the UE.

In some embodiments, a DSDS UE is configured with a first SIM and a second SIM, where each of the first SIM and the second SIM is coupled to the radio and configured to be used with a radio of the UE for wireless communication.

In some embodiments, the UE is configured to transmit a connection request message to a base station over a first network, where the connection request message comprises one or more capability indications of the UE. In various embodiments, the one or more UE capability indications may include an indication of support by the UE for requesting short or long network switching; an indication of whether one or both of periodic and one-time short network switching are supported by the UE; and/or a preference to request short or long network switching based on a time duration for a network switch, a cause of the network switch, and/or a radio resource control (RRC) state preference for the network switch.

Alternatively or additionally, in some embodiments the one or more UE capability indications include frequency band conflict information related to the first and second SIMS, where the frequency band conflict information is usable by the first network to avoid a frequency band conflict between communications using the first and second SIMs.

The UE is further configured to receive a message from the base station, where the message includes one or more network capability indications corresponding to respective UE capability indications of the one or more UE capability indications. The message received from the base station may be a connection accept message (such as an attach accept message (in LTE) or a registration accept message (in 5G)), or it may be an initial registration message that is received prior to setting up a connection between the UE and the network. The network capability indications may include an indication of support by the first network to selectively provide short or long network switching, an indication that one or both of periodic and one-time short network switching are allowed by the first network, an indication of one or more of the switching attributes that are allowed by the first network to request short or long network switching, and/or an indication that the base station supports providing a paging cause indicator with paging messages.

The UE is further configured to perform communications with the base station according to the one or more network capability indications.

Such techniques may be used individually or in any combination, as desired. A wireless device that implements such techniques may, at least in some instances, improve communication performance, according to various embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
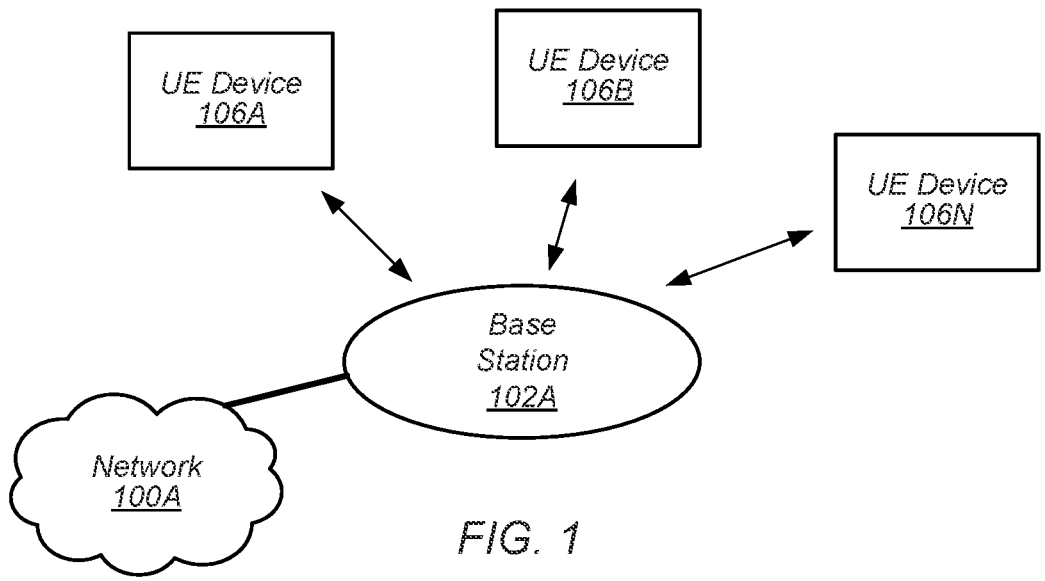
FIGS. 1-2 illustrate exemplary wireless communication systems between UE devices and one or more networks through one or more base stations, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
LTE-A: LTE-Advanced
5G NR: $5^{th}$ Generation New Radio
SIM: Subscriber Identity Module
eSIM: embedded SIM
IMSI: International Mobile Subscriber Identity
MCC: Mobile Country Code
MNC: Mobile Network Code

Terms

The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), wearable devices (e.g., smart watch, smart glasses), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
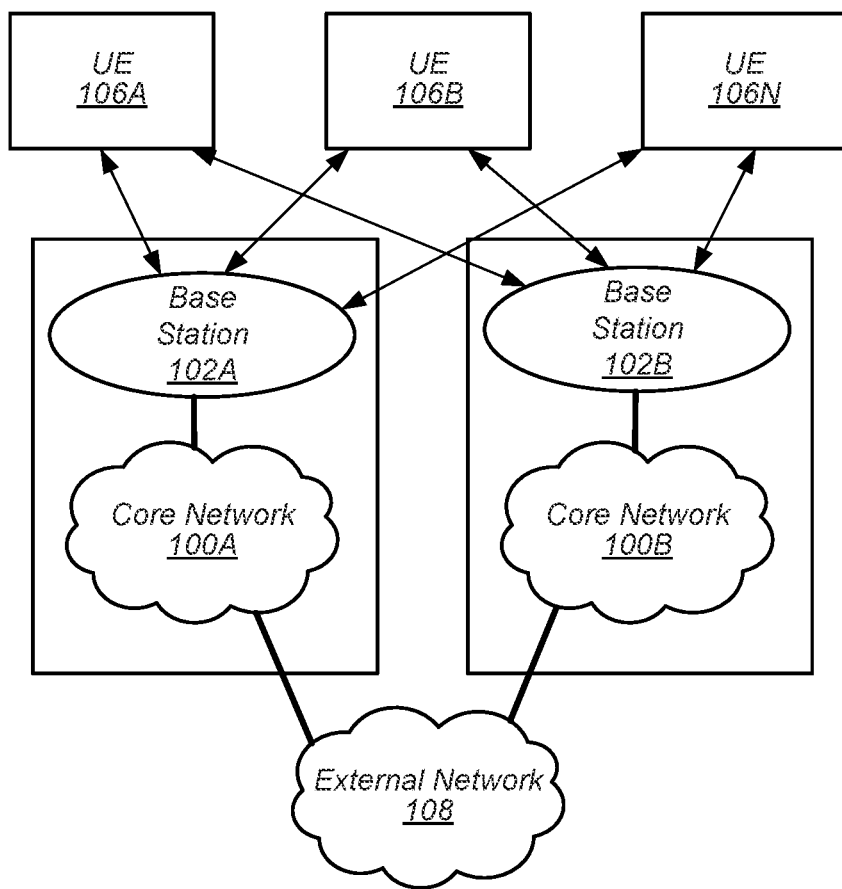
Figure 3:
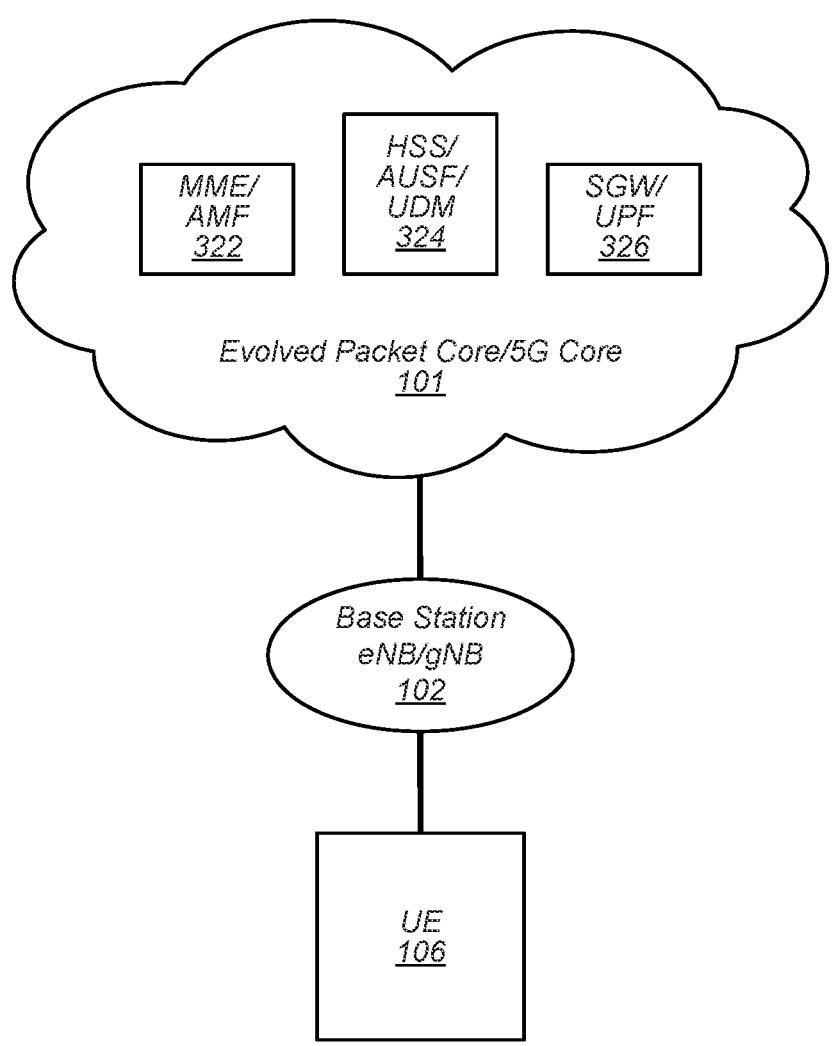
FIG. 3 illustrates an example cellular network system including an evolved packet core (EPC), according to some embodiments.

FIGS. 1-3—Communication System

FIGS. 1 and 2 illustrate exemplary (and simplified) wireless communication systems. It is noted that the systems of FIGS. 1 and 2 are merely examples of certain possible systems, and embodiments may be implemented in any of various systems, as desired.

The exemplary wireless communication system of FIG. 1 includes a base station 102A which communicates over a transmission medium with one or more user equipment (UE) devices 106A, 106B, etc., through 106N. Each of the user equipment devices may be referred to herein as a "user equipment" (UE). In the exemplary wireless communication system of FIG. 2, in addition to the base station 102A, base station 102B also (e.g., simultaneously or concurrently) communicates over a transmission medium with the UE devices 106A, 106B, etc., through 106N. If the base station 102A is implemented in the context of LTE, it may alternately be referred to as an 'eNodeB' or 'eNB'. If the base station 102A is implemented in the context of 5G NR, it may alternately be referred to as a 'gNodeB' or 'gNB'.

The base stations 102A and 102B may be base transceiver stations (BTSs) or cell sites, and may include hardware that enables wireless communication with the user devices 106A through 106N. Each base station 102 may also be equipped to communicate with a core network 100 (base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), or any other network. Thus, the base station 102A may facilitate communication between the user devices and/or between the user devices and the network 100A; in the exemplary system of FIG. 2, the base station 102B may also facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 5G NR, 3GPP2 CDMA2000 (e.g., bxRTT, 1xEV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and 5G NR, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, 5G NR, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-DCMA, TD-SCDMA, etc.), CDMA2000 (1xRTT, 1xEV-DO, HRPD, eHRPD, etc.), 5G NR, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either (or both) of GSM or LTE using a single shared radio. The shared radio may include a single antenna, or may include multiple antennas (e.g., for MIMO) for performing wireless communications.

FIG. 3—Example Cellular Network

FIG. 3 illustrates a simplified block diagram of an example cellular network (wireless communication system) that may be particularly useful for implementing various of the embodiments described herein. The UE 106 may be in communication with a cellular network, where the cellular network may comprise a base station 102 (e.g., an eNB or a gNB for LTE or 5G NR, respectively) and a core such as an evolved packet core (EPC) in LTE or a 5G core (5GC) in 5G, as shown. The UE 106 may communicate in a wireless manner with the base station 102. In turn, the base station 102 may be coupled to a core network, shown in this example embodiment as an EPC/5GC 101. As shown, the EPC/5GC 101 may include mobility management entity (MME) (in LTE) or access and mobility function (AMF) (in 5G) 322, home subscriber server (HSS) (in LTE) or a authentication server function (AUSF) and unified data manager (UDM) (in 5G) 324, and serving gateway (SGW) (in LTE) or user plane function (UPF) (in 5G) 326. The EPC/5GC 100 may include various other devices known to those skilled in the art as well.

Operations described herein as being performed by the cellular network (or NW) may be performed by one or more of the cellular network devices shown in FIG. 3, such as one or more of base station, 102, MME/AMF 322, HSS 324, or SGW/UPF 326 in EPC/5GC 100, among possible others.

Figure 4:
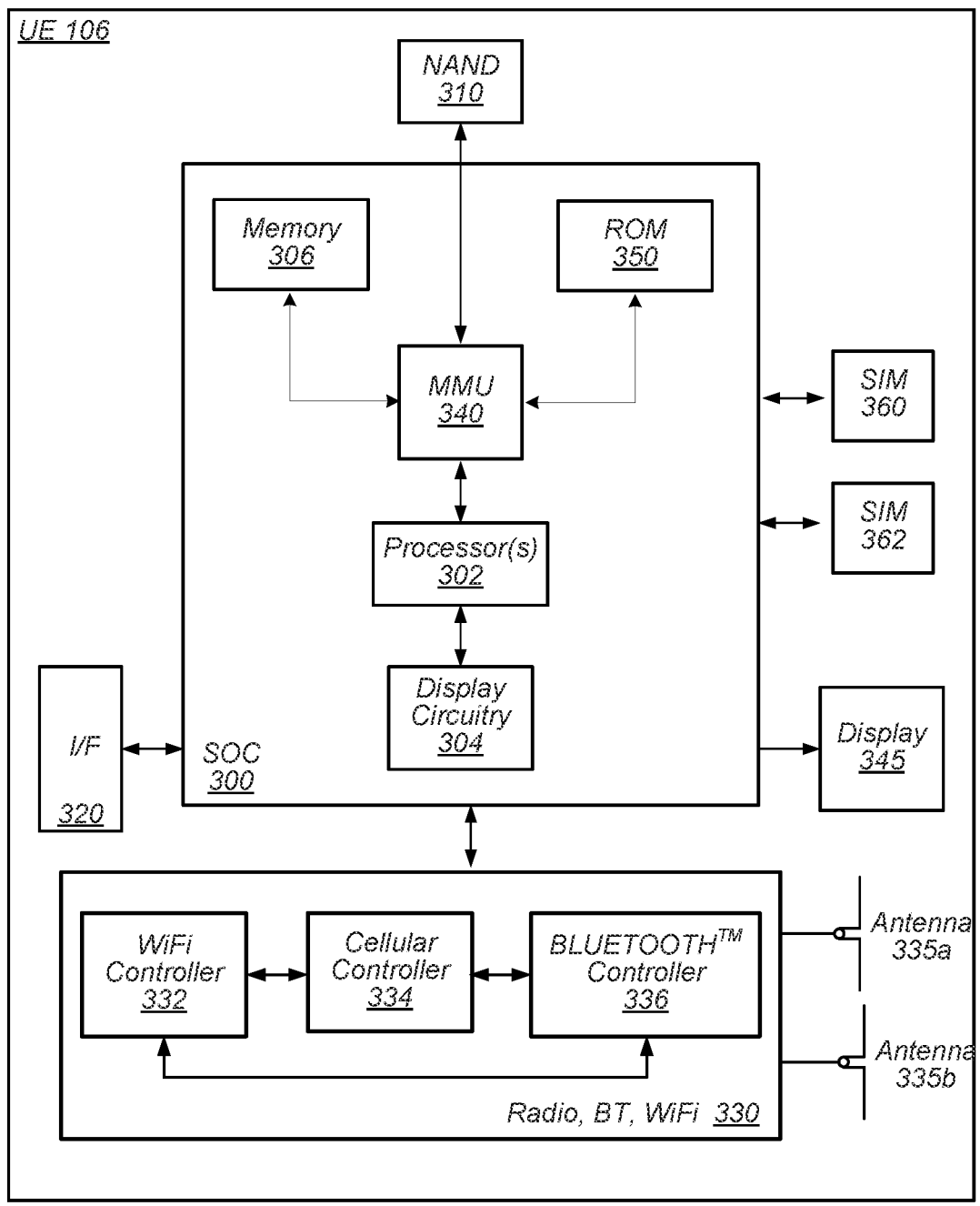
FIG. 4 illustrates an example block diagram of a user equipment device, according to some embodiments.

FIG. 4—Example Block Diagram of a UE

FIG. 4 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 345, and wireless communication circuitry 330 (e.g., for LTE, LTE-A, NR, CDMA2000, BLUETOOTH, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform implicit radio resource control state transitions in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform implicit radio resource control state transitions in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g., NR controller) 334, and BLUETOOTH controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH controller 336 may communicate with cellular controller 334 over a cell-ISM link, etc. While three separate controllers are illustrated within radio 330, other embodiments have fewer or more similar controllers for various different RATs that may be implemented in UE device 106.

As shown, the UE 106 may also include two or more subscriber identity modules (SIMS) 360 and 362. One or both of SIMS 360 and 362 may be implemented as an embedded SIM (eSIM). In this case, the SIMs 360 and/or 362 may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or both of SIMS 360 and 362 may be implemented as removeable SIM cards.

Each SIM 360 or 362 may include a number of types of information, including personalized information specific to a user and/or device (e.g., personalized information), and information that is not specific to a user and/or device (e.g., common information). The personalized information may include user/unit specific data, for example information identifying the user/unit to their carrier's network, personalized authorization and/or security information, etc. Some or all of the personalized information may be used as a subscriber identity for the UE 106, for example in order to identify the UE 106 to a carrier's network and to obtain cellular service from the carrier.

As one example, the personalized information may include one or more International Mobile Subscriber Identity (IMSI) numbers. An IMSI may identify the subscriber to their carrier's network. The IMSI may, for example, be a number including the subscriber's "home" mobile country code (MCC) and mobile network code (MNC), as well as a Mobile Subscription Identification Number (MSIN) which is unique to the subscriber. The personalized information may also or alternatively include a personal identification number (PIN) (e.g., a code which the user may use to access their SIM), a personal unblocking code and/or personal unblocking key (PUC/PUK), and one or more authentication keys (K/Ki). Any of a variety of other personalized information may also or alternatively be used, as desired.

Thus, each SIM 360 and 362 may contain subscriber identity information that may be used to identify the UE 106 to its subscriber's carrier cellular network. As noted above, the UE 106 may utilize multiple subscriber identities. For example, a user may consider it desirable to obtain service from multiple carriers for any of a variety of reasons, including differing footprints/service areas of different carriers, different service plans/pricing offered by different carriers, or different technologies used. In some cases it may be desirable to utilize multiple subscriber identities (whether from the same or different carriers) as a means of differentiating types of interactions, such as work-related communications and personal communications.

As a further possibility, a situation might arise in which it might be desirable to utilize multiple subscriber identities in a single device for some carriers which implement LTE networks. In particular, in many cases an LTE (e.g., as a packet-switched communication technology) network may be (at least initially) deployed for data communications (e.g., web browsing, email and other networking applications, etc.), while a (e.g., pre-existing) GSM and/or UMTS (e.g., which may include circuit-switched communication technologies) network may be utilized provided for voice communications.

As further described below, the UE may implement various techniques which enable a particular SIM to perform suspend and resume operations with the cellular network while reducing disruption due to RRC state mismatch. Accordingly, as described further subsequently herein, the UE 106 may include hardware and software components for implementing methods for improved suspend/resume operations when transitioning between use of the different SIMS.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 5:
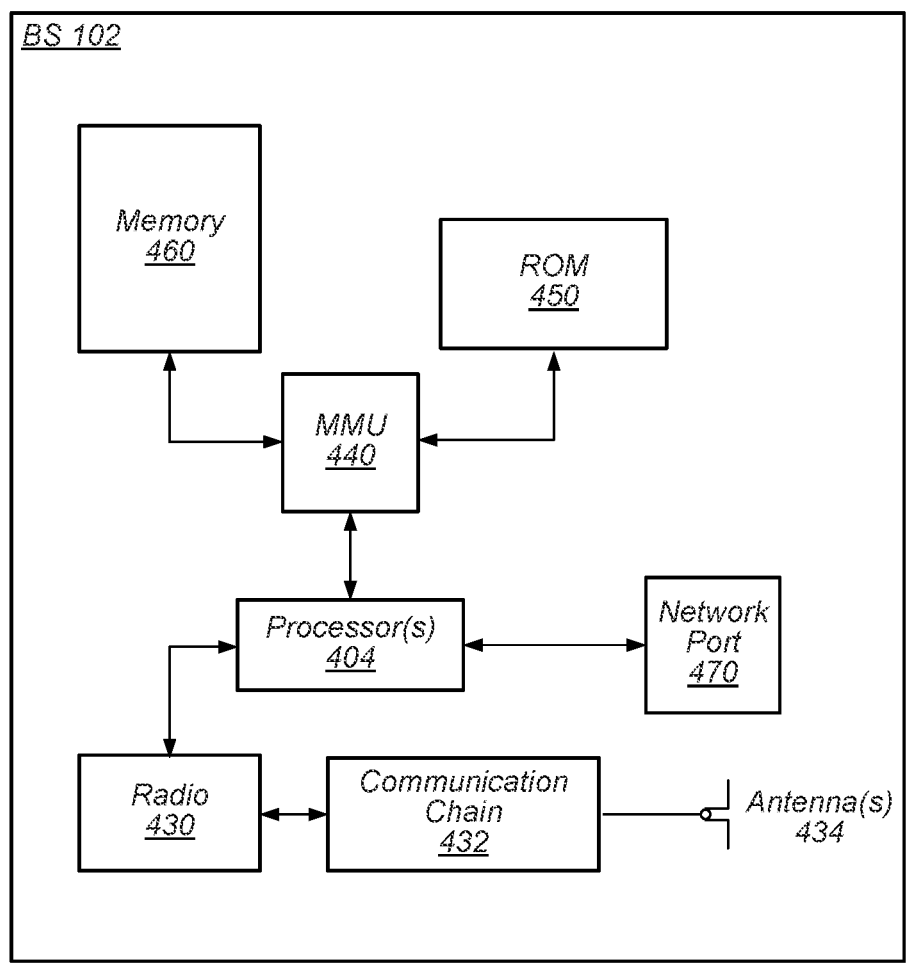
FIG. 5 illustrates an example block diagram of a base station, according to some embodiments.

FIG. 5—Exemplary Block Diagram of a Base Station

FIG. 5 illustrates an exemplary block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

The cellular network devices such as shown in FIG. 3 may have a somewhat similar architecture as described above, but would typically not include RF circuitry or an antenna. Thus each of the cellular network devices shown in FIG. 3 would typically have a processing element and memory for performing their respective functions.

As used herein, a network or cellular network (e.g., NW1 and/or NW2 as described below) may refer to one or more physical entities contained within a network infrastructure to perform the described methods. For example, a gNB (or eNB) such as that illustrated in FIG. 5 may directly receive indications and messaging from the UE and may relay these messages from the UE to an access and mobility management function (AMF) or a mobile management entity (MME) on the Core Network side. The MME (or AMF) may inform the eNB (or gNB) to retain the RRC context of the UE (i.e. a Connected state and/or an established EPS bearer/PDU session along with the QoS details), the MME (or AMF) may start the timer, and if the timer expires before the suspended SIM resumes, the MME (or AMF) may inform the serving gateway (S-GW) or the user plane function (UPF) to release the bearers/PDN contexts for UE as well as inform the eNB (or gNB) to release the UE context (i.e. to forget the C-RNTI and the rest of the state information of the UE and consider the UE to be IDLE). If the timer is running and the eNB (or gNB) gets an RRC resume request from the UE, then the eNB (or gNB) may confirm that the C-RNTI exists and that the UE context may be recovered and may forward the Resume request to the MME (or AMF), which may inform the S-GW (or UPF) to modify the radio bearer (e.g., if they had earlier told the S-GW or UPF to freeze their context), stop the timer, and/or continue as if the UE was connected. Said another way, the combination of eNB-MME-SGW for LTE or gNB-AMF-UPF for 5G NR may be understood as being interconnectedly involved in performing the embodiments described herein.

Radio Resource Control States

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device (e.g., such as the UE 106) may commonly operate in one of multiple possible conditions (e.g., states or modes) with respect to RRC. For simplicity, the condition of a wireless device with respect to RRC may be referred to subsequently herein as its RRC state. For example, in LTE, a wireless device may operate in a RRC connected state (e.g., in which the wireless device can perform continuous data transfer, and in which handover between cells is managed by the network and access stratum context information is retained for the wireless device), or in a RRC idle state (e.g., in which the wireless device may operate in a more battery efficient state when not performing continuous data transfer, in which the wireless device may handle its cell re-selection activities, and in which the network may not retain access stratum context information for the wireless device).

In addition to RRC connected and RRC idle states, it may also be possible to support one or more other types of RRC states for a wireless device, at least according to some embodiments. For example, for 5G NR, an RRC inactive state in which a wireless device may be able to operate in a relatively battery efficient manner while the network also retains at least some access stratum context information may be supported. At least according to some embodiments, such a state may employ wireless device-based mobility, e.g., such that a wireless device can move within a radio access network notification area (RNA) without notifying the next generation (NG) radio access network (RAN). While in this state, a wireless device may perform cell re-selection and system information acquisition for itself, e.g., based at least in part on system information broadcast by potential candidate cells. At the same time, the last serving base station (e.g., gNB) may keep the wireless device context and the NG connection with the 5G core network (CN) associated with the wireless device, e.g., to facilitate easier transition back to a RRC connected state. When paging a wireless device in RRC inactive state, RNA specific parameters may be used by the RAN, for example including a UE specific discontinuous reception (DRX) and UE Identity Index value (e.g., I-RNTI).

Use of a RRC inactive state may help reduce the network signaling overhead for a wireless device's connection, at least in some instances. For example, for a wireless device with infrequent data transmissions, utilizing such a RRC inactive state may reduce the amount of mobility related signaling (e.g., for handovers) needed compared to a RRC connected state, e.g., since the wireless device may be able to manage its own cell re-selection process when moving between cells. For such a wireless device, utilizing a RRC inactive state may also reduce the amount of connection setup related signaling needed compared to a RRC idle state, e.g., since the network may retain at least some context information for the wireless device. This may directly reduce the signaling latency associated with a transition to a RRC connected state.

As another potential benefit, such a state may reduce the control plane delay for a wireless device, e.g., in comparison to operating in a RRC idle state. For example, a reduced access stratum connection setup period and/or non-access stratum connection setup period may be possible for a RRC inactive state relative to a RRC idle state. The time to move from a battery efficient state to the start of continuous data transfer may thus be reduced.

Additionally, such a state may improve the power saving capability of a wireless device, e.g., in comparison to operating in a RRC connected state. For example, while in the RRC connected state, serving and/or neighboring cell measurements may be required more frequently than while in the RRC inactive state, e.g., at least in line with a connected discontinuous reception (C-DRX) period of the wireless device.

One use case that may be (or become) common in cellular communication systems may include what may be referred to as a massive machine type communication (mMTC) scenario, e.g., in which high device densities that tend to perform small periodic data communication activities are present in a cellular network. For such devices, once a data transmission is over, a device's RRC connection may be released after a pre-determined period of connection activity by way of explicit RRC connection release signaling provided by the network, at least as one possibility. However, such an explicit mechanism of releasing RRC connections may cause a heavy signaling burden on the network in the case of a mMTC scenario, at least in some instances. Further, use of a pre-determined period of connection inactivity prior to RRC connection release may represent a potential waste of power, e.g., as it may guarantee that wireless devices may spend at least a certain amount of time in RRC connected state but not performing any data activity before being released to a potentially more power efficient RRC idle or RRC inactive state. This may be particularly costly for some machine type communication (MTC) devices that may be highly power constrained (e.g., potentially with battery life expectations of 5-10 years, among other possibilities, according to various embodiments).

Band Conflicts for Multi-SIM Devices

As described above, some UE devices may be capable of containing multiple subscriber identity modules, or SIMS. In some cases, these SIMs may be Universal SIMs, or USIMs. Some UE devices with multiple SIMS, i.e., dual-SIM (e.g., dual-SIM dual-standby (DSDS) devices) and multi-SIM devices, including multi-USIM (or MUSIM) devices, may have any combination of singular or multiple receivers and transmitters. In other words, different multi-SIM UEs may have either a one receiver (Rx) system (to share between the multiple SIMS) or a multiple Rx system (where each SIM has a dedicated receiver) for conducting cellular communications for their multiple SIMS. Similarly, multi-SIM UEs may have either one or multiple transmitters. For multi-SIM UEs that share a single receiver and/or transmitter between multiple SIMs, it may become necessary for the UE to timeshare the receiver and/or transmitter by suspending activity on one SIM while undertaking another activity on another SIM for reception and/or transmission.

Some DSDS devices may operate as dual-SIM dual-active (DSDA) devices, wherein the DSDA device is configured with two receivers and two transmitters, where each of the two SIMs of the DSDA device has its own dedicated transmitter and receiver. These devices may be able to transmit and receive communications with both SIMs simultaneously. Simultaneous transmission and/or reception over multiple SIMs may introduce radio frequency (RF) band conflicts when the transmitters and/or receivers are tuned to specific frequency bands. These RF band conflicts may be mitigated according to some embodiments described herein.

Some DSDS devices may operate as dual-receiver DSDS (DR-DSDS) devices, where the UE is configured with dual receivers but only a single transmitter. These devices may be capable of receiving communications for both SIMs simultaneously, but alternate their transmission activity using a single shared transmitter. During DR-DSDS modes of operation, there may be RF band conflicts when the two receivers are tuned to specific frequency bands. As one example, a first SIM (SIM1) may be camped on a first frequency band, a second SIM (SIM2) may be camped on a second frequency band, and both SIMs may be in IDLE mode. In this example, one or both receivers may have impaired reception in terms of page reception, system information block (SIB) decoding or measurements when the first and second frequency bands have a conflict during simultaneous reception (e.g., from band overlap, intermodulation products, or interference between harmonic frequencies).

Another example of RF band conflicts may occur in Connected-IDLE scenarios where SIM1 is in an RRC connected mode on a first frequency band (e.g., band B1), SIM2 is in an RRC idle mode on a second frequency band (e.g., band B66), and SIM1 transmissions on the first frequency band introduce direct interference to SIM2 reception on the second frequency band (alternatively, some of the harmonics of the first frequency band transmissions may interfere with reception on the second frequency band). In general, DR-DSDS communications may experience band conflicts that impair the capability of the UE to operate in the DR-DSDS configuration. Similar challenges may be present for DSDA modes of operation, albeit at a larger scale than DR-DSDS because simultaneous transmissions on two bands increases the interference on other co-located receivers tuned to another frequency band. Even further, these problems may be exacerbated as the number of SIMs in a MUSIM configuration increases.

Various communications scenarios may lead to a band conflict. As a first example, band conflicts may arise in an idle-idle (or inactive-inactive, idle-inactive, inactive-idle) configuration where both SIMs of a dual-SIM device are in a combination of RRC idle and/or inactive states. In these configurations, a band conflict may arise upon cell selection, where serving cell bands of the two SIMs in idle and/or inactive mode conflict with each other (i.e. simultaneous reception for all supported band combinations is not possible or introduces undesirable interference). Alternatively, a band conflict may arise when an idle or inactive mode SIM reselects to another frequency band that is in conflict with the other SIM's idle or inactive mode serving frequency band.

As a second example, band conflicts may arise in a connected-idle (or connected-inactive) configuration, where one of the two SIMS is in a connected state and the other SIM is in either an idle or inactive state. In these configurations, a band conflict may arise when the SIM that is in the connected state is measuring a frequency band that conflicts with the serving frequency of the SIM in the idle or inactive state. Alternatively, a band conflict may arise when one SIM enters into connected mode and its transmissions result in interference to the idle or inactive mode SIM. Alternatively, the connected mode SIM may be redirected or undergo a handover to another frequency band that leads to interference with the serving frequency of the idle or inactive mode SIM. Alternatively, a new component carrier, dual connectivity (DC) connection, or multi-RAT dual connectivity (MR-DC) connection may be configured on the connected mode SIM that conflicts with reception over the idle or inactive mode SIM. As yet another example, the idle or inactive mode SIM may reselect to another frequency band that enters a band conflict with transmissions of the connected mode SIM.

In some embodiments, a dual-SIM UE may take mitigation steps upon detection of a band conflict. As a first example, the UE may perform autonomous mitigation (i.e., without first negotiating the mitigation steps with the network). For example, if the two SIMs of the UE are in idle mode, one of the SIMs may autonomously perform reselection to a frequency band that doesn't conflict with the other SIM's serving frequency.

In various embodiments, when performing frequency selection to mitigate a band conflict, the UE may either selectively or randomly determine which SIM should perform reselection to the non-conflicting frequency band. For example, the UE may be selective in deciding which SIM should stay camped on its current serving cell and which SIM attempts reselection. Selectively determining the SIM that remains camped on its current serving frequency may be based on various factors, including but not limited to:

1) the RAT used for communicating with each SIM (i.e., a SIM communicating on a newer RAT such as 5G NR may preferentially remain camped on the current frequency while a SIM communicating with a legacy RAT such as LTE may perform inter-frequency reselection),
2) capabilities offered by the current serving cell of each SIM,
3) signal strength of communications over each SIM (e.g., the SIM experiencing weaker signal strength may be selected to perform frequency reselection),
4) data preference of each SIM and other services that are mapped to each SIM (for example, Multi-RAT Dual Connectivity (MR-DC), E-UTRAN New Radio Dual Connectivity (ENDC), ultra-reliable low-latency communications (URLLC), etc.),
5) a probability of finding a non-conflicting frequency for each SIM based on neighbor cells configured in system information or via dedicated signaling, or
6) mobility of the UE, among other possibilities.

In some embodiments, a data preferred SIM may preferentially keep its frequency while a non-data preferred SIM may perform inter-frequency reselection to avoid band collisions.

Alternatively, the UE may randomly determine which SIM should remain camped on serving cell and which one should attempt reselection to another frequency to alleviate the band conflict.

In some embodiments, the UE may switch from a DR-DSDS mode to a single-receive DSDS (SR-DSDS) mode and stop parallel reception on the conflicting frequency bands. In this mode, a single receiver is timeshared by the two SIMs depending on the communication requirements of each SIM.

Figure 6:
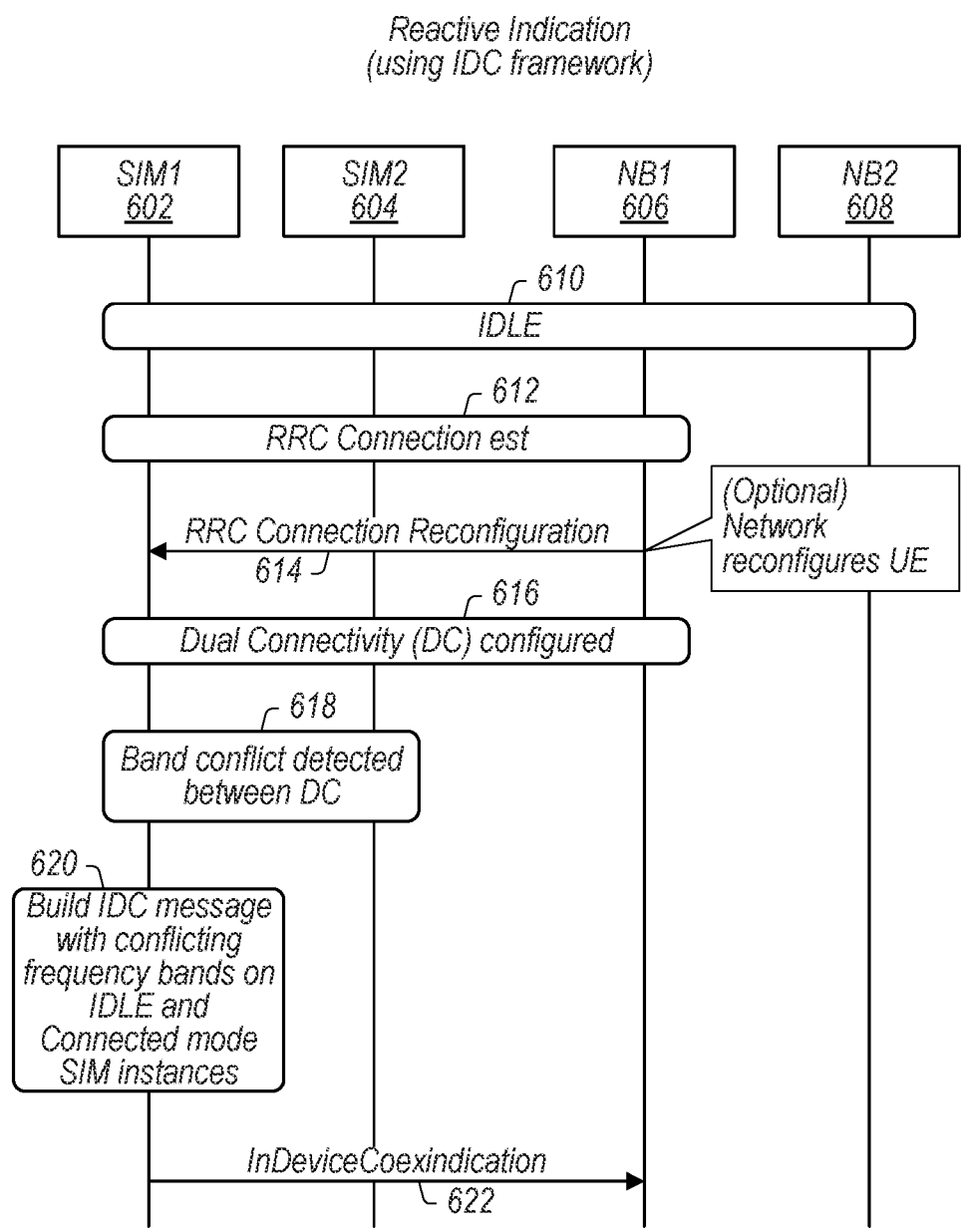
FIG. 6 is a network communication flow diagram illustrating a method for providing a reactive band conflict indication, according to some embodiments.

In some embodiments, rather than autonomously mitigating the band conflict, the UE may mitigate the band conflict using explicit reporting to the network. As a first example, and as illustrated in FIG. 6, the UE may provide a reactive indication to the network when a band conflict is detected while one of the SIM is in connected mode. For example, the connected mode SIM may transmit a conflict indication using an In-Device Coexistence (IDC) message, a measurement or event report message, or a UE assistance information message to the network to indicate the presence of the band conflict and the frequency band(s) that is(are) in conflict. Additionally or alternatively, the UE may also report non-conflicting neighboring frequency measurements to assist the network in deciding which non-conflicting neighboring frequency band to perform a handover to the UE for use with the connected mode SIM.

Figure 7:
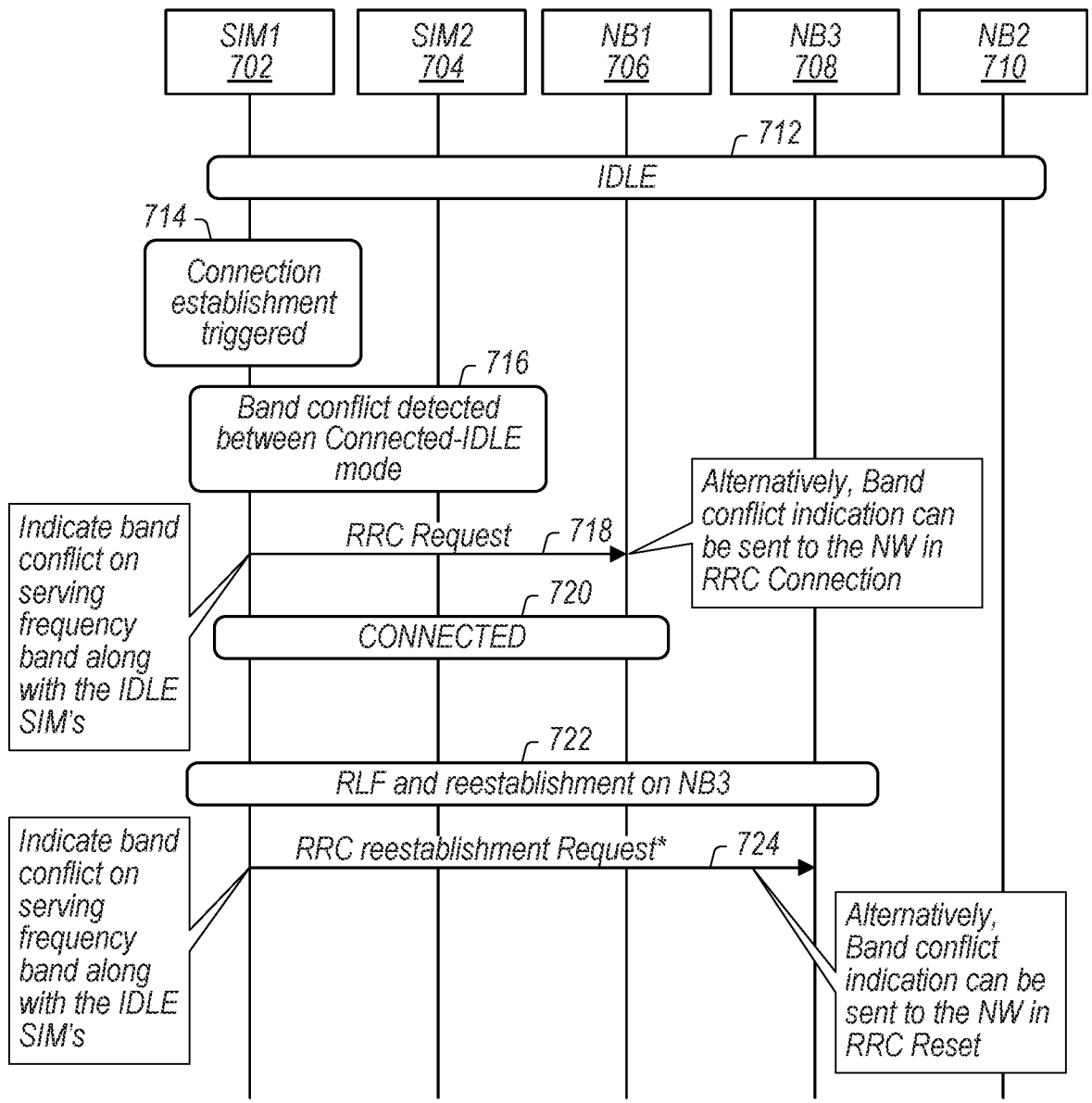
FIG. 7 is a network communication flow diagram illustrating a method for providing a proactive band conflict indication, according to some embodiments.

Alternatively, as illustrated in FIG. 7, the UE may provide a proactive indication to the network prior to detection of a band conflict. For example, the UE may report, to the network serving the first SIM, the serving cell frequency of its second SIM that is in idle mode while establishing a connected mode with its first SIM. In some embodiments, the proactive indication is provided as a UE capability indication within a connection request message, as described in FIG. 11.

Figure 8:
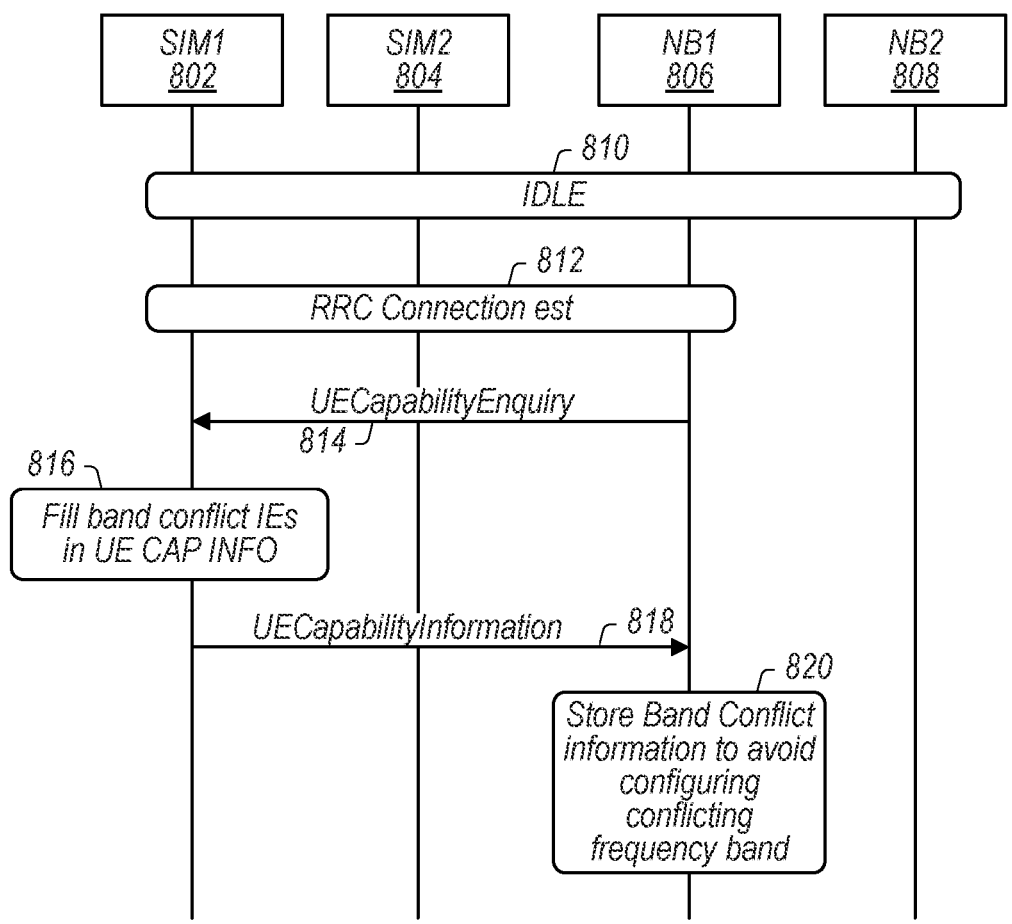
FIG. 8 is a network communication flow diagram illustrating a method for providing UE capability reporting to avoid band conflicts, according to some embodiments.

As a third possibility, as illustrated in FIG. 8, the UE may perform capability reporting whereby the UE reports conflicting bands (based on UE configuration) to the network via a UE capability information message. Band conflict information may be grouped into idle-idle, connected-idle and connected-connected groups so that the network is aware of the UE's limitations in different connection scenarios. Band combinations that conflict may be encoded in a bit mask to allow a number of band conflicts to be reported in the UE capability information message. Alternatively, the UE may indicate that it requests band conflict avoidance on the bands that it indicates it is supporting and the network may create band conflict avoidance planning based on a pre-defined band conflict table. Similar to proactive reporting, the network may allocate frequency bands to the UE for measurement, handover, redirection and carrier aggregation based on the indication provided by the UE (i.e., to avoid band conflicts).

In some embodiments, after the UE has transmitted reactive or proactive reporting to the network and the band conflict due to the dual receiver activity has been alleviated (e.g., due to one of the SIMS camping on a non-conflicting frequency band), the UE may transmit a cancellation indication to the network indicating cancellation of the previously transmitted band conflict indication, to inform the network that the UE is no longer experiencing or at risk of experiencing a band conflict.

In some embodiments, the network transmits a preference indication to the UE indicating its preference on how the UE should handle band conflicts while in a MUSIM mode of operation. In various embodiments, the network may alternatively indicate that a) it provides no support for band conflict resolution (in this case the UE may then elect to mitigate band conflicts autonomously), or b) that it does support band conflict resolution (in this case the UE may report band conflicts using various options as described above). The network may indicate its support (or lack thereof) for band conflict resolution via System Information Broadcast (SIB) messaging or via dedicated signaling such as RRC Reconfiguration, RRC Setup, RRC Resume and/or RRC Reestablishment messaging, among other possibilities. The preference indication may be provided as a network capability indication within a connection accept message, as described in FIG. 11.

In some embodiments, upon receiving the conflict indication of a band conflict from a UE over the first SIM (e.g., through an IDC message, UE assistance information (UAI) message, or measurement report), the network may handover the connected mode (first) SIM to another frequency band that doesn't conflict with the idle mode frequency band of the second SIM of the UE. Information on non-conflicting frequency band measurements may be provided by the UE in the IDC/UAI/measurement report that indicated the band conflict to the NW. Additionally or alternatively, upon receiving the conflict indication, the network may remove or deactivate master cell group (MCG) Secondary Cells (SCells) or secondary cell group (SCG) primary secondary cells (PSCells) or SCells from the set of cell groups for the first SIM to mitigate the band conflict.

In the case of uplink carrier aggregation (CA) operations with multiple component carriers (CCs), upon receiving the conflict indication, the network may allocate uplink physical resource block (PRB) resources on CC(s) whose intermodulation distortion and harmonics don't fall into the frequency range of the conflicted system receiver.

In some embodiments, upon receiving the conflict indication, the network may configure a supplementary uplink (SUL) that does not have a paired downlink frequency instead of a normal UL (i.e., a normal UL that does have a paired downlink frequency) for UE transmissions, where the SUL doesn't conflict with the Rx of the idle mode (second) SIM.

In some embodiments, when the UE proactively reports the idle mode SIM's frequency band, the network may refrain from configuring measurements or component carriers on a frequency that conflicts with the idle mode SIM's serving frequency band until the UE reports a change in the idle mode SIM's serving frequency band. Additionally or alternatively, the network may configure all frequency bands but may prioritize the frequency bands that are not conflicting for measurements and other dedicated procedures. Proactive reporting of band conflicts by the UE may be preferable to reactive reporting in some scenarios, as reactive reporting may lead to increased signaling load in the UL if multiple UEs simultaneously perform signaling to the network to indicate band conflicts (e.g., during mobility scenarios).

In some embodiments, the network, may refrain from redirecting, performing handovers, adding a CC, or implementing dual connectivity for a first SIM on a frequency band that will conflict with the second SIM.

Capability Indications for Network Switching and Paging Causes

In some embodiments, a dual-SIM UE is configured to provide a UE capability indication to the network to avoid paging collisions (i.e., between pages to different SIMs of the UE), improve network switching performance, and/or to enhance UE awareness of incoming page causes.

In various embodiments, the dual SIMs of the UE may belong to the same or different operators, and they may be physical SIMs or embedded SIMS (eSIMs). Advantageously, embodiments described herein for providing UE capability indications may be performed without operator (i.e., network) coordination, such that the described methods may be operable in a variety of different communication environments serviced by different network operators and operator types.

In some embodiments, a UE in an RRC connected state with a first network (NW A) may have to switch to a second network (NW B) to do a protocol activity with NW B (e.g., a periodic signaling procedure, a page decode or a voice call, among other possibilities). For short signaling activity (e.g., a periodic signaling procedure, tracking area update (TAU), radio network area update (RNAU), or a page decode, among other possibilities), it may be desirable for the UE to request a short switching procedure. Alternatively, for long signaling activity or signaling activity with a non-deterministic duration, (e.g., a voice call), it may be desirable for the UE to request a long switching procedure.

Short and long switching procedures may be defined by the network for a particular radio access technology (RAT) protocol. In a short switching procedure, NW A may keep some or all of the UE context while the UE is tuned away to NW B, since NW A expects the UE to return after a relatively short period of time (e.g., a number of seconds or milliseconds). Conversely, in a long switching procedure, NW A may not maintain the UE context, or may not maintain as many components of the UE context, as NW A expects the UE to be tuned away to NW B for a longer or indefinite period of time.

Figure 9:
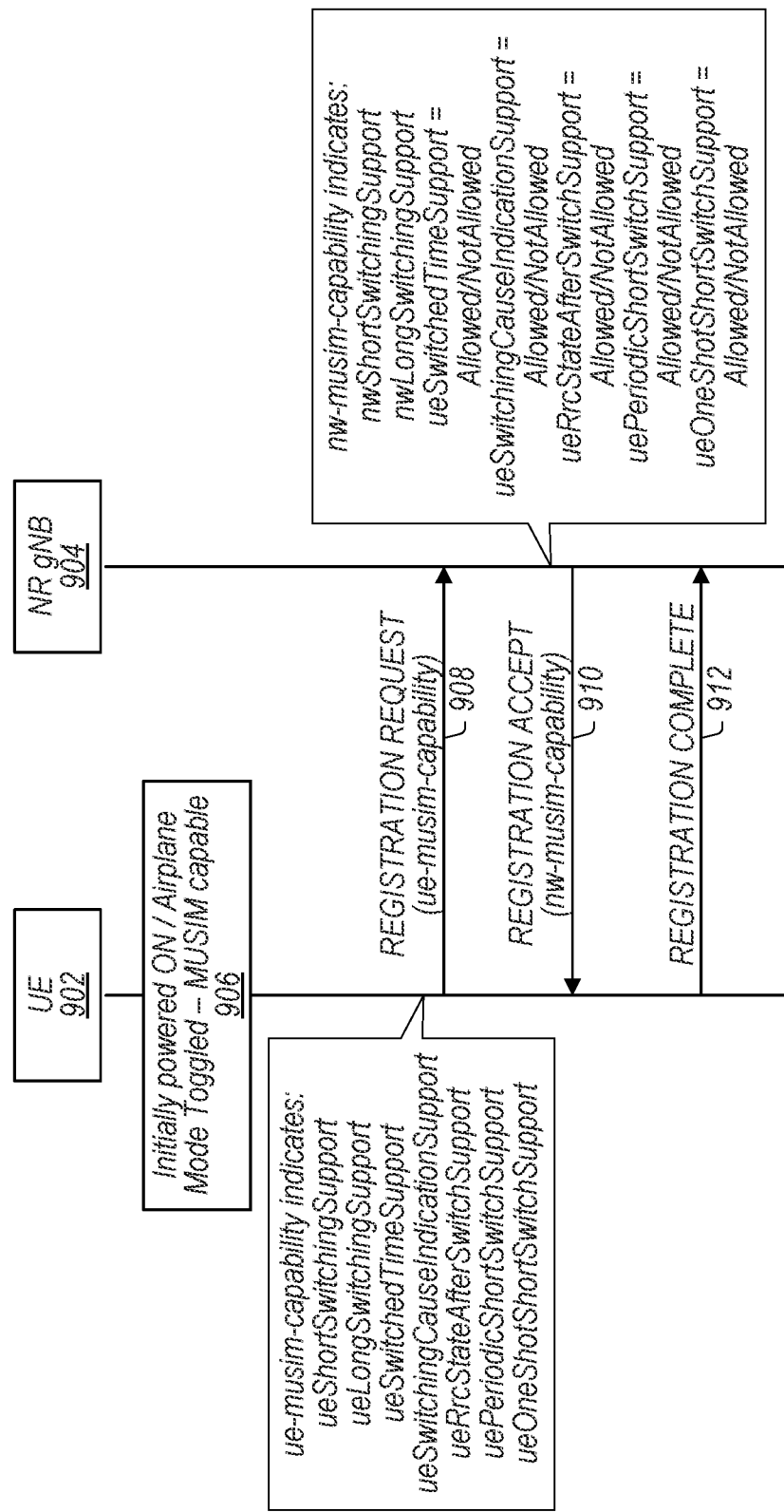
FIG. 9 is a network communication flow diagram illustrating a method for exchanging multi-SIM capability information in a $5^{th}$ Generation New Radio (5G NR) network, according to some embodiments.
Figure 10:
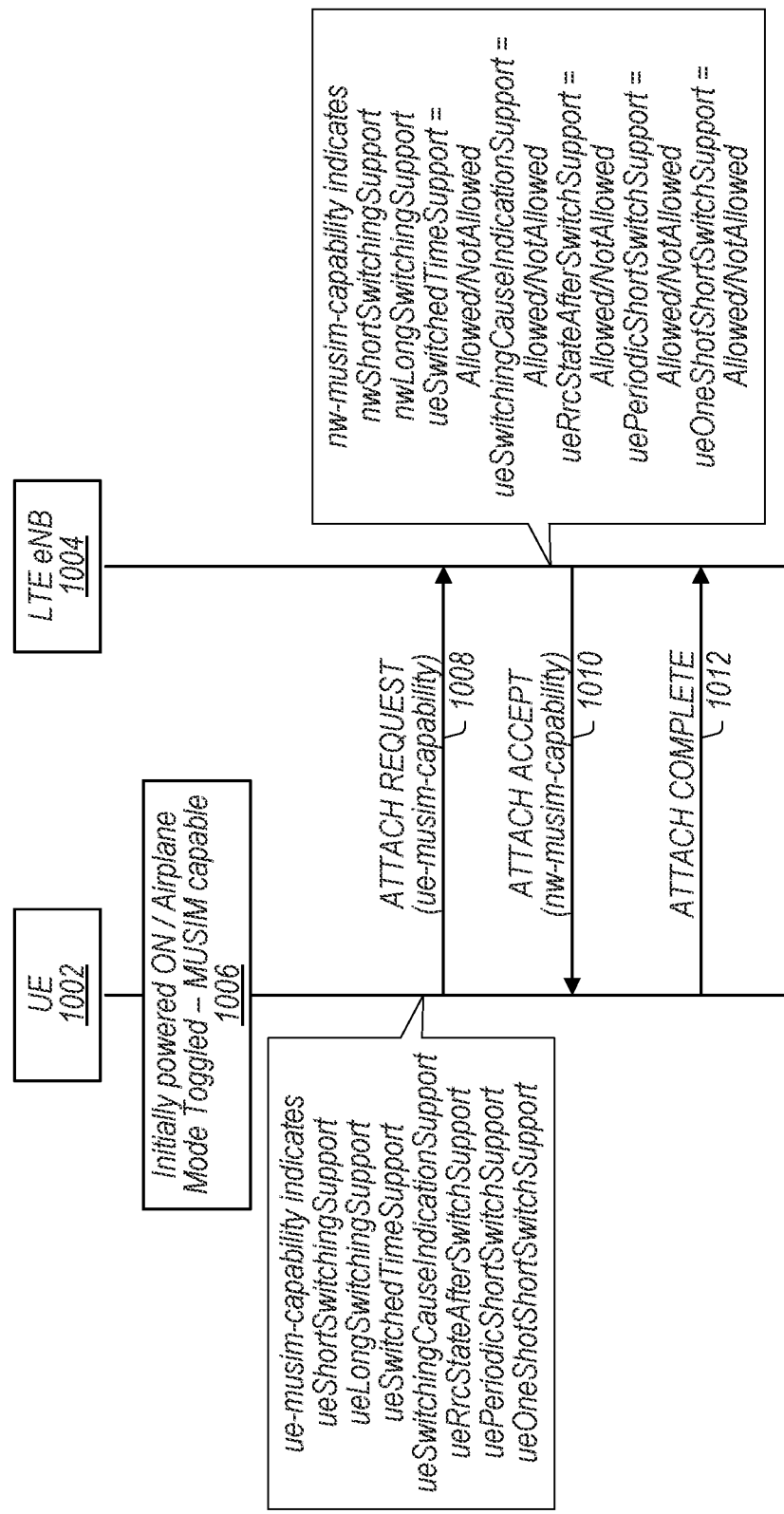
FIG. 10 is a network communication flow diagram illustrating a method for exchanging multi-SIM capability information in a long-term evolution (LTE) network, according to some embodiments.

To address these and other concerns, in some embodiments, during the initial connection establishment messaging, capability information is exchanged between the UE and the network (NW). The capability information exchange may occur during a registration procedure as shown in FIG. 9 (e.g., in a 5G NR network), or it may occur during an attach procedure as shown in FIG. 10 (e.g., in an LTE network).

In some embodiments, as part of an initial registration or attach procedure with a network, a UE may transmit a registration request message (as in FIG. 9) or an attach request message (as in FIG. 10) that contains one or more UE capability indications. The UE capability indications may include an indication that the UE supports short switching and/or long switching. It may further indicate whether it supports a capability to request for short or long switching based on a specific switching attribute such as a switching time duration, a switching cause, and/or an RRC state preference. In other words, the UE may request a capability to report a requested switching time duration as a proxy for whether the requested switch should be a short or long switch (e.g., a requested time duration less than a predetermined threshold may correspond to a request for a short switching procedure). Similarly, different switching causes and/or RRC state preferences may correspond to short or long switching procedures.

The NW may respond to the UE with a registration accept or attach accept message that contains NW capability information. The NW capability information may indicate whether the NW supports differentiation between short and long switching (i.e., if the NW can selectively perform either of short and long switching in different switching scenarios). When the NW does support selective switching behavior, it may further indicate in the NW capability information which of the switching attributes requested by the UE are supported to trigger different switching types (i.e., long or short).

For each of short and long switching, the UE and the NW may agree on which attributes the UE is allowed to indicate while requesting a switch. Advantageously, this may allow different NW implementations to adapt the switching logic based on the input attribute(s) from the UE, and/or the UE may adapt its switching protocol based on what is allowed by a particular NW implementation.

In addition to an indication of support for short switching, the UE capability indication may indicate if the short switching to be performed by the UE will be a periodic or a one-off switching procedure. For example, periodic switching may be used for idle/inactive discontinuous reception (DRX) page decoding or periodic TAU/RNAU for a SIM, where the short switch is expected to periodically occur a number of times. Alternatively, single shot (one-off) switching may be used for user-triggered manual public land mobile network (PLMN) searches and/or out-of-service (OOS) recovery searches for a SIM, where it is expected that only a single short switch will occur. In these embodiments, the NW may respond with network capability information indicating whether the NW supports differentiation between periodic and single shot short switching. If this differentiation is supported, the NW may further indicate, based on the received UE capability information, which of the switching attribute(s) are allowed.

In the case where a SIM of a dual-SIM or multi-SIM UE is removed or inserted, (i.e., the UE switches from a multi-SIM mode to a single SIM mode, or vice versa), the UE may send an updated UE capability indication to the NW that it is or is no longer MUSIM capable. This may indicate to the NW to disable/enable periodic/single shot switching capabilities for the UE.

Paging Cause Uncertainty

In some embodiments, it may be desirable for a UE receiving a page to determine whether the page is for an incoming voice call (e.g. VoLTE/VoNR) or not. In some embodiments, a page from the network may include a paging cause indicator that informs the UE that the current incoming page is for a voice call. However, if the paging cause indicator is absent, in previous implementations the UE may be unable to determine whether the absence is because a) the base station doesn't support provision of the paging cause indicator or b) the base station does support provision of the paging cause indicator, but the paging message is not for a voice call.

To address these and other concerns, in some embodiments, during an initial registration or attachment procedure, the NW may specify whether it supports transmitting the paging cause indicator. This support indication may be transmitted as part of a registration accept or radio network area (RNA) update message (e.g., in a 5G NR network) or as part of an attach accept or tracking area update (TAU) message (e.g., in an LTE network). For example, the NW may specify whether it supports transmitting the paging cause indicator in the registration accept message 910 or the attach accept message 1010 shown in FIGS. 9 and 10, respectively.

On the UE side, when support for the paging cause indicator is not provided by the NW, the UE may determine that the UE will not apply any distinguishing methods between receiving voice and non-voice paging messages, since the UE will not receive advanced notice of whether a page is for a voice call. When the NW indicates during initial access that it does support providing the paging cause indicator, absence of a paging cause indicator in a subsequent paging message would inform the UE that the incoming page is not for a VoLTE or VoNR voice call. Advantageously, the combination of the paging cause support indicator within the connection accept message and the paging cause indicator in the paging message enables the UE to distinguish between the three cases of 1) the NW sending a page for a voice call, 2) the NW sending a page that is not for a voice call, and 3) the NW sending a page where it is unknown whether it is for a voice call or not.

Figure 11:
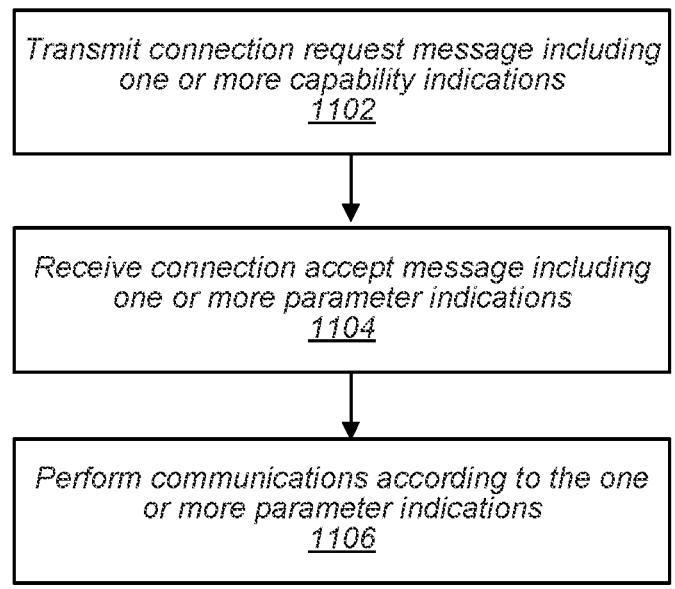
FIG. 11 is a flowchart diagram illustrating a method for exchanging UE and network capability indications, according to some embodiments.

FIG. 11—Flowchart for Exchanging Capability Information with a Network

FIG. 11 is a flowchart diagram illustrating a method for a multi-SIM wireless device (e.g., a wireless user equipment (UE) device 106) to exchange capability and network capability indications with a network, according to some embodiments. Aspects of the method of FIG. 11 may be implemented by a wireless device, e.g., in conjunction with a cellular base station, such as a UE 106 and a BS 102 illustrated in and described with respect to various of the Figures herein, or more generally in conjunction with any of the computer systems or devices shown in the above Figures, among other devices, as desired. The UE may include a radio with one or more antennas for performing wireless communication and a processor operatively coupled to the radio. The UE may further include first and second subscriber identity modules (SIMs), where each of the first and second SIMs is coupled to the radio and configured to be used with the radio for wireless communication.

Note that while at least some elements of the method of FIG. 11 are described in a manner relating to the use of communication techniques and/or features associated with 5G NR and/or 3GPP specification documents, such description is not intended to be limiting to the disclosure, and aspects of the method of FIG. 11 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 11 may operate as follows.

At 1102, the UE uses the first SIM to transmit a connection request message to a base station over a first network. The connection request message includes one or more UE capability indications. The one or more UE capability indications may include any of the capability indications described in relation to FIGS. 7-10, i.e., the UE capability indications may include an indication of RF band conflict avoidance information for a second SIM of the UE, support for requesting short/long switching procedures, support for one or more switching attributes as proxies for short/long switching procedure requests, and/or support for requesting periodic and one-shot short switching procedures.

At 1104, the UE receives a message from the base station. The message includes one or more network capability indications corresponding to respective UE capability indications of the one or more UE capability indications. The message received from the base station may be a connection accept message (such as an attach accept message (in LTE) or a registration accept message (in 5G)), or it may be an initial registration message that is received prior to setting up a connection between the UE and the network. The one or more network capability indications may include any of the network capability indications described in relation to FIGS. 7-10, i.e., the network capability indications may include an indication that the NW supports providing RF band conflict avoidance assistance, supports providing paging cause indications, supports selective provisioning of short/long switching procedures, supports one or more switching attributes as proxies for short/long switching procedure requests, and/or supports receiving requests periodic and one-shot short switching procedures.

At 1106, the UE performs communications with the base station according to the one or more network capability indications. In various embodiments, this may include requesting a long or short switching procedure, potentially using a network-supported switching attribute to request the long or short switching procedure, and/or requesting a periodic or one-shot short switching procedure.

Performing performs communications according to the one or more network capability indications may additionally or alternatively include receiving a paging message that includes a paging cause indicator that indicates whether the paging message is for a packet-switched voice call.

Performing performs communications according to the one or more network capability indications may additionally or alternatively include providing an indication of a potential or actual RF band conflict caused by simultaneous reception over first and second SIMs of the UE. The band conflict indication may be used by the NW to avoid or resolve the band conflict (i.e., by retuning the first SIM to a non-conflicting frequency, indicating to the UE to autonomously resolve the band conflict, among other possibilities as described above).

In some embodiments, the one or more UE capability indications include an indication of support by the UE for requesting short or long network switching, the one or more network capability indications include an indication of support by the first network to selectively provide short or long network switching, and performing communications with the base station according to the one or more network capability indications includes performing a short or long network switch to a second network.

In some embodiments, the one or more UE capability indications further include an indication of whether one or both of periodic and one-time short network switching are supported by the UE, and the one or more network capability indications include an indication that one or both of periodic and one-time short network switching are allowed by the first network.

In some embodiments, the one or more UE capability indications further include a preference to request short or long network switching based on one or more switching attributes, where the one or more switching attributes include one or more of a time duration for a network switch, a cause of the network switch, and a radio resource control (RRC) state preference for the network switch. In these embodiments, the one or more network capability indications may further include an indication of one or more of the switching attributes that are allowed by the first network to request short or long network switching.

In some embodiments, the one or more network capability indications further comprise an indication that the base station supports providing a paging cause indicator with paging messages, and performing communications with the base station according to the one or more network capability indications include receiving, by the UE, a paging message from the base station including the paging cause indicator indicating whether the page is for a packet-switched voice call.

In some embodiments, the base station is a gNB, the first network is a 5th Generation New Radio (5G NR) network, the connection request message is a registration request message, and the connection accept message is a registration accept message. Alternatively, in some embodiments the base station is an eNB, the first network is a long-term evolution (LTE) network, the connection request message is an attach request message, and the connection accept message is an attach accept message.

In some embodiments, the one or more UE capability indications include frequency band conflict information related to the first and second SIMs. The frequency band conflict information may usable by the first network to avoid a frequency band conflict between communications using the first and second SIMS. In other words, the base station may implement at least one frequency band conflict avoidance procedure based at least in part on the frequency band conflict information to avoid a frequency band conflict between communications using the first and second SIMs.

In some embodiments, the at least one frequency band conflict avoidance procedure includes one or more of performing a handover for the first SIM to a frequency band that doesn't conflict with communications over the second SIM; removing or deactivating a master cell group (MCG) secondary cell (SCell), a secondary cell group (SCG) primary secondary cell (PSCell), or an SCG SCell for communications with the UE; allocating physical resource block (PRB) resources for the UE on component carriers whose intermodulation distortion and harmonics avoid the frequency band conflict; configuring a supplementary uplink instead of a normal uplink for the communications with the UE; or prioritizing frequency bands for the communications with the UE that avoid the frequency band conflict.

In some embodiments, the UE is further configured to determine that the first SIM has transitioned to communicating with a non-conflicting frequency band. Responsive to determining that the first SIM has transitioned to communicating with the non-conflicting frequency band, the UE may be configured to transmit an updated capability indication to the base station indicating that the first SIM has transitioned to communicating with the non-conflicting frequency band. The base station may halt implementation of the at least one frequency band conflict avoidance procedure based responsive to receiving the updated capability indication.

In some embodiments, the frequency band conflict information includes a specification of a serving cell frequency used by the second SIM in an idle mode.

In some embodiments, the frequency band conflict information specifies potential frequency band conflicts between the first and second SIMs when each of the first and second SIMs are in an idle or a connected mode. For example, the frequency band conflict information may separately specify potential frequency band conflicts for different combinations of RRC states for the first and second SIMs (e.g., SIM1=idle/SIM2=connected, SIM1=connected/SIM2=connected, SIM1=idle/SIM2=idle, SIM1=inactive/SIM2=connected, etc.)

In some embodiments, the frequency band conflict information is mapped to a pre-defined frequency band conflict table that is usable by the first network to allocate a communication frequency to the UE to avoid a frequency band conflict between communications using the first and second SIMs. In other words, the base station may allocate a communication frequency for the UE based on the mapping to the pre-defined frequency band conflict table to avoid a frequency band conflict between communications of the UE using the first and second SIMs.

In some embodiments, the one or more network capability indications include an indication that the first network does not support frequency band conflict resolution, and performing communications with the base station according to the one or more network capability indications includes autonomously avoiding a potential frequency band conflict by reselecting a frequency for receiving communications over the first SIM or the second SIM.

In some embodiments, the UE determines whether to reselect the frequency for receiving communications over the first SIM or the second SIM based at least in part on a comparison of one or more factors, including: 1) radio access technologies (RATs) used for communicating with the first and second SIMs, 2) capabilities offered by serving cells of the first and second SIMs, 3) signal strengths of communications over the first and second SIMS, 4) data preferences for the first and second SIMS, or 5) probabilities of finding non-conflicting frequencies for the first and second SIMs. Alternatively or additionally, frequency reselection may be performed on the first or second SIM based on mobility of the UE. In some embodiments, a SIM communicating with a legacy RAT preferentially has its frequency for receiving communications reselected over a SIM communicating with a newer RAT. In other embodiments, it is randomly determined whether to reselect the frequency for receiving communications over the first SIM or the second SIM.

The following numbered paragraphs describe additional embodiments.

In some embodiments, a user equipment (UE) device comprises a radio including a first and second receive (Rx) antenna and a transmit (Tx) antenna for performing wireless communication. The UE further comprises a processor operatively coupled to the radio, a first subscriber identity module (SIM) configured to be used with the first Rx antenna and the Tx antenna for wireless communication, and a second SIM configured to be used with the second Rx antenna and the Tx antenna for wireless communication.

In some embodiments, the UE is configured to establish a first connection with a first network using the first SIM, establish a second connection with a second network using the second SIM, determine that a frequency band conflict has occurred between the first and second connections, and provide a band conflict indication to the first network.

In some embodiments, the band conflict indication is provided within a UE assistance information message, a measurement report, or an in-device coexistence message.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE), a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A user equipment (UE) device, the UE device comprising:
   a radio, comprising one or more antennas for performing wireless communications;
   a processor operatively coupled to the radio; and
   first and second subscriber identity modules (SIMs), wherein each of the first SIM and the second SIM is coupled to the radio and configured to be used with the radio for the wireless communications;
   wherein the UE device is configured to, using the first SIM:
      transmit a registration request message to a first network via a base station, wherein the registration request message comprises one or more UE capability indications;
      receive a registration accept message from the base station, wherein the registration accept message comprises one or more network capability indications corresponding to respective UE capability indications of the one or more UE capability indications, wherein the one or more network capability indications further comprise an indication that the network supports providing a paging cause indicator with paging messages;
      receive, by the UE device, a paging message from the base station including the paging cause indicator indicating whether the paging message is for a packet-switched voice call;
      receive, by the UE device, a second paging message from the base station, wherein the second paging message does not include the paging cause indicator, and
      determining, based on an absence of the paging cause indicator in the second paging message and on the registration accept message comprising the one or more network capability indications comprising an indication that the network supports providing a paging cause indicator with paging messages, that the second paging message is not for the packet-switched voice call.

2. The UE device of claim 1,
   wherein the one or more UE capability indications comprise an indication of support by the UE device for requesting short or long network switching, and
   wherein the one or more network capability indications comprise an indication of support by the first network to selectively provide short or long network switching, and wherein the UE device is further configured to:
   perform a short or long network switch to a second network.

3. The UE device of claim 2,
   wherein the one or more UE capability indications further comprise an indication of whether one or both of periodic and one-time short network switching are supported by the UE device, and
   wherein the one or more network capability indications comprise an indication that one or both of periodic and one-time short network switching are allowed by the first network.

4. The UE device of claim 2,
   wherein the one or more UE capability indications further comprise a preference to request short or long network switching based on one or more switching attributes, wherein the one or more switching attributes comprise one or more of:
      a time duration for a network switch;
      a cause of the network switch; and
      a radio resource control (RRC) state preference for the network switch, and
   wherein the one or more network capability indications further comprise an indication of one or more of the switching attributes that are allowed by the first network to request short or long network switching.

5. The UE device of claim 1, wherein the UE device is further configured to:
   wherein the combination of a paging cause support indicator within the registration accept message and the paging cause indicator in the paging message enables the UE to distinguish between cases of 1) the network sending a page for a voice call, 2) the network sending a page that is not for a voice call, and 3) the network sending a page where it is unknown whether or not it is for a voice call.

6. A base station, comprising:
   a radio, comprising one or more antennas for performing wireless communications;
   a processor operatively coupled to the radio, wherein the base station is configured to:
      receive a registration request message from a user equipment (UE) using a first subscriber identity module (SIM) over a first network, wherein the registration request message comprises one or more UE capability indications;
      transmit a registration accept message to the UE, wherein the registration accept message comprises one or more network capability indications corresponding to respective UE capability indications of the one or more UE capability indications, wherein the one or more network capability indications further comprise an indication that the network supports providing a paging cause indicator with paging messages;

transmit, to the UE device, a paging message including the paging cause indicator indicating whether the paging message is for a packet-switched voice call; and transmit, to the UE device, a second paging message, wherein the second paging message does not include the paging cause indicator, wherein transmitting the registration accept message comprising the one or more network capability indications comprising an indication that the network supports providing a paging cause indicator with paging messages and transmitting the second paging message without the paging cause indicator indicates that the second paging message is not for the packet-switched voice call.

7. The base station of claim 6,
wherein the one or more UE capability indications comprise an indication of support by the UE for requesting short or long network switching, and
wherein the one or more network capability indications comprise an indication of support by the first network to selectively provide short or long network switching.

8. The base station of claim 7,
wherein the one or more UE capability indications further comprise an indication of whether one or both of periodic and one-time short network switching are supported by the UE, and
wherein the one or more network capability indications comprise an indication that one or both of periodic and one-time short network switching are allowed by the first network.

9. The base station of claim 7,
wherein the one or more UE capability indications further comprise a preference to request short or long network switching based on one or more switching attributes, wherein the one or more switching attributes comprise one or more of:
a time duration for a network switch;
a cause of the network switch; and
a radio resource control (RRC) state preference for the network switch.

10. The base station of claim 9,
wherein the one or more network capability indications further comprise an indication of one or more of the switching attributes that are allowed by the first network to request short or long network switching.

11. The base station of claim 6, wherein:
the base station is a gNB and the first network is a 5th Generation New Radio (5G NR) network.

12. The base station of claim 6, wherein:
the base station is an eNB and the first network is a long term evolution (LTE) network.

13. The base station of claim 6,
wherein the one or more UE capability indications comprise frequency band conflict information related to the first SIM and a second SIM of the UE, wherein the base station is further configured to:
implement at least one frequency band conflict avoidance procedure based at least in part on the frequency band conflict information to avoid a frequency band conflict between communications using the first and second SIMs.

14. The base station of claim 13,
wherein the at least one frequency band conflict avoidance procedure comprises one or more of:
performing a handover for the first SIM to a frequency band that doesn't conflict with communications over the second SIM;
removing or deactivating a master cell group (MCG) secondary cell (SCell), a secondary cell group (SCG) primary secondary cell (PSCell), or an SCG SCell for communications with the UE;
allocating physical resource block (PRB) resources for the UE on component carriers whose intermodulation distortion and harmonics avoid the frequency band conflict;
configuring a supplementary uplink instead of a normal uplink for the communications with the UE; or
prioritizing frequency bands for the communications with the UE that avoid the frequency band conflict.

15. The base station of claim 13, wherein the base station is further configured to:
receive an updated capability indication from the UE indicating that the first SIM has transitioned to communicating with a non-conflicting frequency band; and
halt implementation of the at least one frequency band conflict avoidance procedure based responsive to receiving the updated capability indication.

16. The base station of claim 13,
wherein the frequency band conflict information comprises a specification of a serving cell frequency used by the second SIM in an idle mode.

17. The base station of claim 13,
wherein the frequency band conflict information specifies potential frequency band conflicts between the first and second SIMs when each of the first and second SIMs are in an idle or a connected mode.

18. The base station of claim 13,
wherein the frequency band conflict information is mapped to a pre-defined frequency band conflict table, wherein the base station is further configured to:
allocate a communication frequency for the UE based on the mapping to the pre-defined frequency band conflict table to avoid a frequency band conflict between communications of the UE using the first and second SIMs.

19. An apparatus comprising a processor, wherein the processor is configured to cause a base station to:
receive a registration request message from a user equipment (UE) using a first subscriber identity module (SIM) over a first network, wherein the registration request message comprises one or more UE capability indications;
transmit a registration accept message to the UE, wherein the registration accept message comprises one or more network capability indications corresponding to respective UE capability indications of the one or more UE capability indications, wherein the one or more network capability indications further comprise an indication that the network supports providing a paging cause indicator with paging messages;
transmit, to the UE device, a paging message, wherein the paging message comprises the paging cause indicator indicating whether the paging message is for a packet-switched voice call; and
transmit, to the UE device, a second paging message, wherein the second paging message does not include the paging cause indicator, wherein transmitting the registration accept message comprising the one or more network capability indications comprising an indication that the network supports providing a paging cause indicator with paging messages and transmitting the second paging message without the paging cause indicator indicates that the second paging message is not for the packet-switched voice call.

20. The apparatus of claim 19, wherein the combination of a paging cause support indicator within the registration accept message and the paging cause indicator in the paging message enables the UE to distinguish between cases of 1) the network sending a page for a voice call, 2) the network sending a page that is not for a voice call, and 3) the network sending a page where it is unknown whether or not it is for a voice call.

* * * * *